US012227022B2

(12) United States Patent
Lawandy

(10) Patent No.: US 12,227,022 B2
(45) Date of Patent: Feb. 18, 2025

(54) PATTERNED CONDUCTIVE LAYER FOR SECURE INSTRUMENTS

(71) Applicant: Spectra Systems Corporation, Providence, RI (US)

(72) Inventor: Nabil Lawandy, Saunderstown, RI (US)

(73) Assignee: Spectra Systems Corporation, Providence, RI (US)

( * ) Notice: Subject to any disclaimer, the term of this patent is extended or adjusted under 35 U.S.C. 154(b) by 0 days.

(21) Appl. No.: 17/403,555

(22) Filed: Aug. 16, 2021

(65) Prior Publication Data

US 2023/0050405 A1 Feb. 16, 2023

(51) Int. Cl.

| | |
|---|---|
| ***B42D 25/00*** | (2014.01) |
| ***B42D 25/23*** | (2014.01) |
| ***B42D 25/29*** | (2014.01) |
| ***B42D 25/346*** | (2014.01) |
| ***B42D 25/373*** | (2014.01) |
| ***B42D 25/378*** | (2014.01) |

(52) U.S. Cl.

CPC ........... *B42D 25/378* (2014.10); *B42D 25/23* (2014.10); *B42D 25/29* (2014.10); *B42D 25/346* (2014.10); *B42D 25/373* (2014.10)

(58) Field of Classification Search

CPC ...... B42D 25/346; B42D 25/373; G07D 7/02; G07D 7/023

See application file for complete search history.

(56) References Cited

U.S. PATENT DOCUMENTS

| | | | | |
|---|---|---|---|---|
| 6,933,051 | B2 | 8/2005 | Fleming et al. | |
| 7,808,605 | B2 | 10/2010 | Hoffmuller et al. | |
| 8,350,768 | B2 | 1/2013 | Peters | |
| 9,834,030 | B2 | 12/2017 | Tompkin et al. | |
| 10,252,562 | B2 | 4/2019 | Holmes | |
| 2002/0114931 | A1 * | 8/2002 | Beghello | D21H 21/48 428/209 |
| 2009/0033085 | A1 * | 2/2009 | Suto | G07D 7/10 283/67 |
| 2009/0243279 | A1 * | 10/2009 | Bundy | B42D 25/355 283/92 |
| 2010/0045024 | A1 | 2/2010 | Attner et al. | |

(Continued)

FOREIGN PATENT DOCUMENTS

| | | | | |
|---|---|---|---|---|
| DE | 4334797 A1 * | 3/1995 | | B42D 25/29 |
| JP | 2006277443 A * | 10/2006 | | |

(Continued)

OTHER PUBLICATIONS

DE 4334797 English Translation (Year: 1995).*

(Continued)

*Primary Examiner* — Kyle R Grabowski

(74) *Attorney, Agent, or Firm* — Pryor Cashman LLP

(57) ABSTRACT

A secure instrument and associated systems and methods of authentication, the secure instrument including a polymer substrate having a first surface and a second surface; an inner layer disposed on or over the first surface of the polymer substrate, the inner layer being a conductive, absorbing, or upconverting layer and including one or more gaps therein; and an opacity layer disposed on or over the inner layer disposed on or over the first surface of the polymer substrate.

15 Claims, 3 Drawing Sheets

(56) References Cited

U.S. PATENT DOCUMENTS

| | | | | |
|---|---|---|---|---|
| 2011/0115212 | A1 | 5/2011 | Hoffmuller et al. | |
| 2014/0210200 | A1 | 7/2014 | Bornschlegl et al. | |
| 2017/0116808 | A1* | 4/2017 | Kobrin | B42D 25/36 |
| 2022/0213651 | A1* | 7/2022 | Seidler | D21H 13/48 |

FOREIGN PATENT DOCUMENTS

| | | | | |
|---|---|---|---|---|
| TW | I343583 | B | 6/2011 | |
| WO | 2014184559 | A1 | 11/2014 | |
| WO | 2016188619 | A1 | 9/2016 | |
| WO | WO-2019197798 | A1 * | 10/2019 | B32B 3/26 |
| WO | WO-2020224800 | A1 * | 11/2020 | B42D 25/29 |

OTHER PUBLICATIONS

International Search Report in PCT/US2022/040176 (Nov. 3, 2022).

Written Opinion of the International Searching Authority in PCT/US2022/040176 (Nov. 3, 2022).

* cited by examiner

PATTERNED CONDUCTIVE LAYER FOR SECURE INSTRUMENTS

TECHNICAL FIELD

The present invention relates generally to secure instruments, including polymer-based banknotes, which include at least a patterned inner layer disposed underneath an external final opacity layer for both ease of high-speed processing and authentication.

BACKGROUND OF THE INVENTION

Counterfeiting is a growing concern and, as a result, secure instruments such as banknotes typically have three levels of authentication. Level I authentication is for public uses and is typically in the form of an optical effect, such as optically variable ink or security threads with optical characteristics that are relatively unique and difficult to duplicate. Level I authentication features include holographic threads and lenticular lens array security threads. Paper banknotes have included Level I authentication features in the form of watermarks.

Similar to Level I authentication features, Level II authentication features are typically known to the public and commercial banks, and include features such as magnetics and fluorescent and phosphorescent inks, which can be read by simple sensors commonly used in automated teller machines (ATMs) and bill acceptors.

Level III security features are machine-readable features and are more sophisticated than Level II authentication features. Level III security features are typically not known to the public and commercial banks and are used to protect against threats from state-sponsored counterfeiters and other well-funded organizations. The covert Level III authentication features are typically in the form of either inks or other features embedded in the substrate of the banknotes.

Over the last two decades, polymer-based banknotes have gradually been gaining market share in the banknote industry, particularly as a result of their longer circulation life, with over thirty countries using polymer substrates including materials such as biaxially-oriented polypropylene (BOPP). The use of polymer substrates has been primarily restricted to lower denominations, as most of the Level III security features that have been employed within paper banknote substrates are not available or suitable for use with polymer-based banknotes. Moreover, most polymer-based banknotes are composed of a BOPP substrate that has been coated with both a conductive layer to eliminate static adhesion of banknotes and an opacity layer disposed thereon. The inclusion of this conductive layer is critical for efficient processing of banknotes on high-speed transports. In such polymer-based banknotes, the images and security features are printed on the opacity layer.

The present invention concerns patterned, internally-disposed layers, such layers being conductive, absorbing, and/or upconverting, for use in secure instruments, including polymer-based banknotes.

SUMMARY OF THE INVENTION

In general, in one aspect, the invention features a secure instrument including a polymer substrate having a first surface and a second surface; an inner layer disposed on or over the first surface of the polymer substrate, the inner layer being a conductive, absorbing, or upconverting layer and including one or more gaps therein; and an opacity layer disposed on or over the inner layer disposed on or over the first surface of the polymer substrate.

Implementations of the invention may include one or more of the following features. The polymer substrate may include BOPP. The inner layer may include one or more of metallic particles or flakes, graphite, indium tin oxide, antimony tin oxide, or a semiconducting polymer. The inner layer further may include a scattering material, the scattering material being one or more of titanium dioxide or zinc oxide. The opacity layer may include one or more of a water-based ink, a solvent-based ink, and scattering particles.

The one or more gaps of the inner layer may be configured such that only a portion of an underlying layer is covered with the inner layer, the underlying layer being the polymer substrate or an intervening layer. The one or more gaps of the inner layer may be configured as a pattern. The one or more gaps of the inner layer may be configured as one or more orthogonally-arranged unconnected lines. The one or more gaps of the inner layer may be configured as one or more shapes, text lettering, or images. The one or more gaps of the inner layer may include at least two different shapes and/or a shape in at least two different sizes.

The secure instrument may further include a second inner layer disposed on or over the second surface of the polymer substrate, the second inner layer being a conductive, absorbing, or upconverting layer, and a second opacity layer disposed on or over the second inner layer disposed on or over the second surface of the polymer substrate. The second inner layer may cover an entirety of an underlying layer, the underlying layer being the polymer substrate or an intervening layer. The second inner layer may include one or more gaps therein. The secure instrument may be a banknote, a credit card, a bank card, a license, an identification document, a tax stamp, or a label.

In general, in another aspect, the invention features a system of authentication including a secure instrument including a polymer substrate having a first surface and a second surface; an inner layer disposed on or over the first surface of the polymer substrate, the inner layer being a conductive, absorbing, or upconverting layer and including one or more gaps therein; and an opacity layer disposed on or over the inner layer disposed on or over the first surface of the polymer substrate; and a detector configured to detect one or more attributes associated with the one or more gaps of the inner layer to authenticate the secure instrument.

Implementations of the invention may include one or more of the following features. The one or more gaps of the inner layer may be configured as one or more orthogonally-arranged unconnected lines, and the detector may be a surface resistance meter configured to detect anisotropic conductivity associated with the inner layer. The system may further include a light source having a wavelength equal or approximate to that of the spacing dimensions of the one or more gaps of the inner layer for producing diffraction effects, where the one or more gaps of the inner layer may be configured as one or more shapes, text lettering, or images, and where the detector may be a spatial detector, a camera, or a quadrant detector array configured to detect anisotropic conductivity or diffraction features associated with the inner layer.

In general, in another aspect, the invention features a method of authentication including providing a secure instrument, the secure instrument including a polymer substrate having a first surface and a second surface; an inner layer disposed on or over the first surface of the polymer substrate, the inner layer being a conductive, absorbing, or upconverting layer and including one or more gaps therein;

and an opacity layer disposed on or over the inner layer disposed on or over the first surface of the polymer substrate; and detecting, by a detector, one or more attributes associated with the one or more gaps of the inner layer to authenticate the secure instrument.

Implementations of the invention may include one or more of the following features. The one or more gaps of the inner layer may be configured as one or more orthogonally-arranged unconnected lines, and the detector may be a surface resistance meter configured to detect anisotropic conductivity associated with the inner layer. The one or more gaps of the inner layer may be configured as one or more shapes, text lettering, or images, and the detector may be a spatial detector, a camera, or a quadrant detector array configured to detect anisotropic conductivity or diffraction features associated with the inner layer and used in coordination with a light source having a wavelength equal or approximate to that of the spacing dimensions of the one or more gaps of the inner layer for producing diffraction effects.

DETAILED DESCRIPTION OF THE PREFERRED EMBODIMENTS

The present invention is directed to secure instruments, including polymer-based banknotes, that include a polymer substrate and a patterned inner layer, such as a conductive, absorbing, and/or upconverting layer, disposed underneath, preferably in contact with, an external opacity layer. For polymer-based banknotes, a standard arrangement of the relevant substrate prior to banknote printing is a 60- to 80-micron layer of BOPP that is first coated with one or more layers of a conductive ink and then one or more opacity layers. The inks may be composed of metallic particles or flakes, graphite, indium tin oxide, antimony tin oxide, or a semiconducting polymer. The inks may be water- or solvent-based. The conductive layer may have a resistance of $10^4$ to $10^7$ Ohms per square centimeter. These conductive layer(s) may also have a white appearance through the addition of scattering particles, such as titanium dioxide and zinc oxide. The opacity layer(s) may be composed of water-based or solvent-based inks, such as those including a binder, a catalyst, a solvent, and scattering particles like titanium dioxide and zinc oxide. In certain embodiments, the inner layer(s) have a similar composition to that of the opacity layer(s), including or excluding the scattering particles.

Figure 1:
FIG. 1 shows a cross-sectional view of an exemplary substrate for use in producing polymer-based banknotes.
Figure 2:
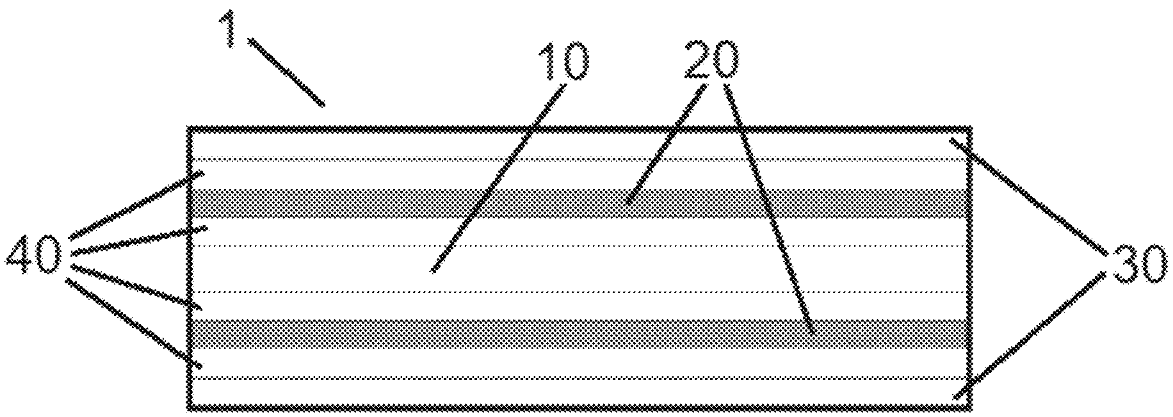
FIG. 2 shows a cross-sectional view of another exemplary substrate for use in producing polymer-based banknotes.

FIG. 1 illustrates an arrangement of a representative substrate for use in producing polymer-based banknotes. In FIG. 1, each inner layer 20 is disposed between the central BOPP layer 10 and an external opacity layer 30 upon which the images of the banknote and security features are applied. Where the inner layer is a conductive layer, the conductive layer is customarily a uniform layer of several grams per square meter covering the entire surface of the BOPP layer. FIG. 2 provides an alternative arrangement in which intervening layers 40 are provided between each inner layer 20 and the central BOPP layer 10 as well as between each inner layer 20 and an external opacity layer 30 upon which the images of the banknote and security features are applied. While the embodiment of FIG. 2 provides for one intervening layer 40 between each inner layer 20 and the central BOPP layer 10 and between each inner layer 20 and an external opacity layer 30, the present invention is not so limited, as intervening layers may be provided between certain layers and not others, and there may be multiple intervening layers stacked together between certain layers. The intervening layers may be composed, for example, of any industry-acceptable polymer material.

In embodiments of the present invention, the substrate includes a patterned inner layer, i.e., a conductive, absorbing, and/or upconverting layer having a specific pattern, in which the conductive, absorbing, and/or upconverting material (e.g., ink) is disposed at certain portions of the layer and omitted from other portions of the layer (i.e., gaps or open spaces), thereby exposing the underlying layer (e.g., polymer substrate or intervening layer(s)). The pattern may provide for a continuous path throughout the underlying layer. The patterned inner layer is then preferably covered with and in direct contact with an opacity layer. Accordingly, such patterning may serve to cover a significantly smaller portion of the substrate or underlying layer, which lowers attendant costs, including costs of the ink material. Patterned inner layers may be disposed on either side of the underlying polymer substrate, either in direct contact with the polymer substrate or otherwise in connection with the polymer substrate (i.e., through intervening layers). Opacity layers may be disposed on any or all of the patterned inner layers.

Figure 3A:
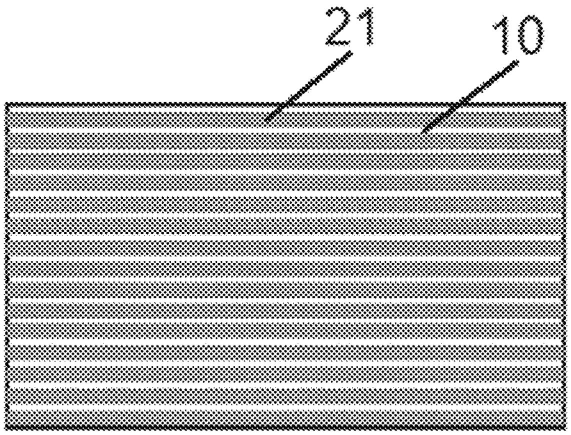
FIG. 3A shows a substrate having a patterned inner layer according to one embodiment of the present invention.
Figure 3B:
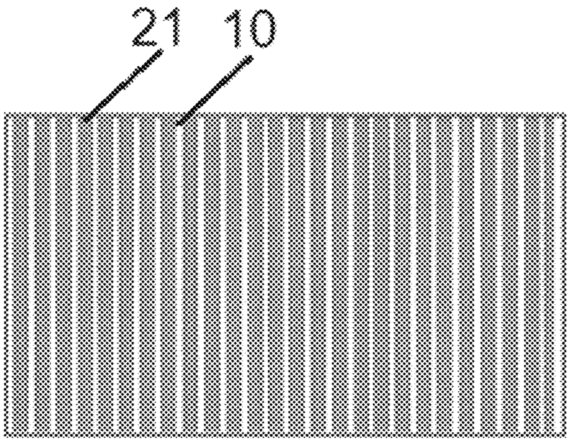
FIG. 3B shows a substrate having a patterned inner layer according to another embodiment of the present invention.

In the embodiments of FIGS. 3A and 3B, the patterned inner layer is a series of parallel lines 21 arranged orthogonally across the substrate. As a result of the lines not being connected to one another, an inner layer that includes a conductive material will have an anisotropic conductivity once covered with an opacity layer, such as a white opacity layer. Additionally, such unconnected line patterns may result in a highly anisotropic static conductivity as well as a dynamic conductivity and polarization sensitive transmission in the infrared (IR) to millimeter wavelength spectrum of electromagnetic radiation. Polarized light parallel to the conductive layer lines will be preferentially transmitted relative to those in the orthogonal polarization.

The anisotropy associated with such patterned inner layers can be interrogated at ultra-high speeds, making this construction ideal for banknote processing environments operating at 40 banknotes or more per second. The anisotropy in the direct current (DC) regime is a security feature that can be identified at the point of acceptance of an item utilizing such a substrate (e.g., a banknote) through use of a surface resistance meter, such as those manufactured by ESDELES (e.g., Model 385).

Figure 3C:
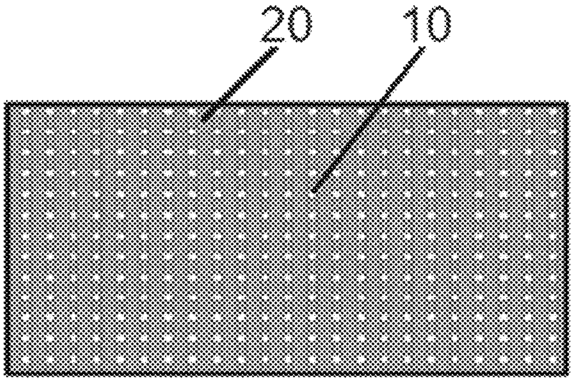
FIG. 3C shows a substrate having a patterned inner layer according to another embodiment of the present invention.

In the embodiment of FIG. 3C, the patterned inner layer is a connected layer that results in an anisotropic conductivity when including a conductive material. Such connected patterns can be used with a detector configured to identify diffraction features from the openings in the connected pattern, i.e., those portions of the inner layer in which the conductive material is omitted. The diffractive features may be identified using a spatial detector, camera, or quadrant detector array and a light source having a wavelength similar to the spacing dimensions.

Figure 3D:
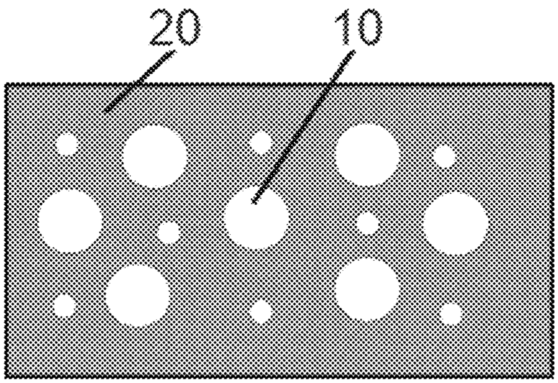
FIG. 3D shows a substrate having a patterned inner layer according to another embodiment of the present invention.

The inner layer of the present invention may be configured as any acceptable pattern, with non-limiting examples including lines arranged orthogonally, non-orthogonally, longitudinally, and laterally, and circles, ellipses, and rectangles of varying aspect ratios constituting the omitted portions of the inner layer. The embodiment of FIG. 3D is one such example. In particular, the embodiment of FIG. 3D is an example of a binary diffraction signature security feature utilizing a patterned inner layer. Accordingly, this substrate exhibits strong diffraction at two wavelength regions, specifically one where the wavelength is similar to that of the smaller circles and one where the wavelength is similar to that of the larger circles.

Figure 3E:
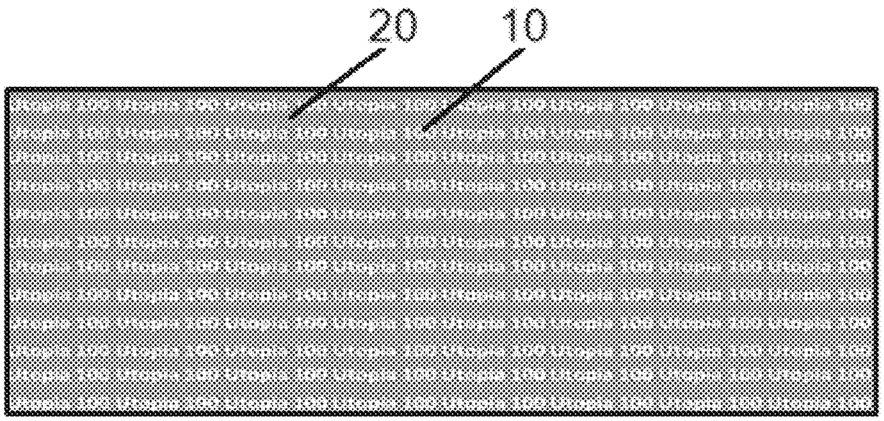
FIG. 3E shows a substrate having a patterned inner layer according to another embodiment of the present invention.

In another embodiment of the present invention, as exemplified by FIG. 3E, the inner layer may be configured such that the omitted portions of the inner layer are text lettering or small images provided in a repeating pattern, preferably such that there is a connected path between distinct portions of the layer.

An additional embodiment of the present invention is directed to a patterned inner layer including absorbing coatings in the IR or other wavelength region that is covered with an opacity layer, e.g., a white opacity layer. Exemplary materials that may be used in the absorbing layer of the present invention include transition metal oxides, rare earth oxides, fluorides, chlorides, or combinations of halogens.

Figure 4:
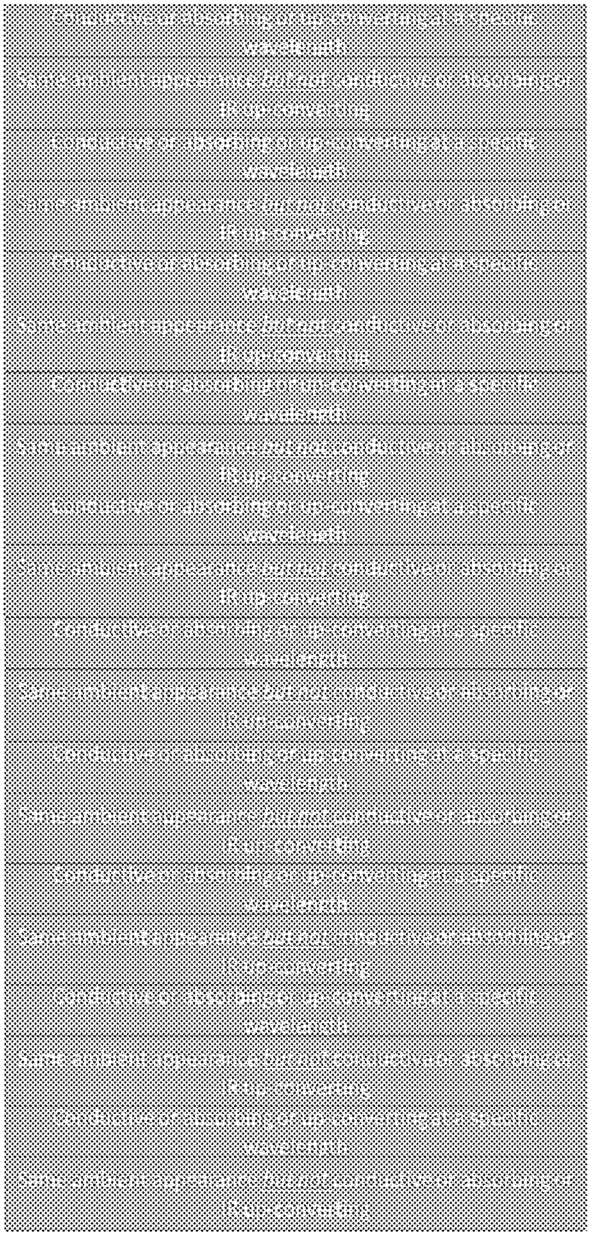
FIG. 4 shows an explanatory illustration of a substrate having a patterned inner layer according to another embodiment of the present invention.

In embodiments of the present invention in which the patterned inner layer remains hidden when examined against a lit background, the patterned inner layer disposed under a final, pre-printing, white opacity layer can be constructed with two inks having the same optical properties in the human eye response curve. Such a patterned inner layer is illustrated in FIG. 4. If such a patterned inner layer is formed by a conductive ink, then the layer will not be visible under examination on a light table or in transmission, but will exhibit anisotropic conductivity. Additionally, if the patterned inner layer is formed by an ink containing an IR absorbing feature, then the layer will not be visible under examination on a light table or in transmission, but will exhibit a pattern when light at the specific wavelength or band of wavelengths of the absorption is utilized.

The same effects can be obtained with upconverting or other emissive features. Photon upconversion provides for the sequential absorption of two or more photons leading to the emission of light at shorter wavelength than the excitation wavelength (e.g., conversion of infrared light to visible light). The two inks must appear the same in the human eye response curve, but when illuminated with IR at a specific wavelength, specific regions will emit light in the prescribed pattern. Moreover, the same principles can be employed with other connected patterns for conductivity and any patterns for absorptive detection of the patterns or images. A typical upconverting material will be excited by efficient semiconductor infrared sources such as GaAs light-emitting diodes (LEDs) or laser diodes. Exemplary materials capable of upconverting include semiconductor quantum dots pumped by two photon absorptions and lanthanide nanocrystals or particles. Lanthanide-doped nanoparticles are nanocrystals of a transparent material, often fluorides such as $NaYF_4$, $NaGdF_4$, $LiYF_4$, $YF_3$, $CaF_2$ or oxides such as $Gd_2O_3$, doped with certain amounts of lanthanide ions. The most common lanthanide ions used in photon upconversion are the pairs erbium-ytterbium ($Er^{3+}$—$Yb^{3+}$) or thulium-ytterbium ($Tm^{3+}$—$Yb^{3+}$). In such combinations, ytterbium ions are added as antennas to absorb light at around 980 nm and transfer such to the upconverter ion. With the ion being erbium, then a characteristic green and red emission is observed, while with the ion being thulium, the emission includes near-ultraviolet blue and red light.

Additionally, while a primary embodiment of the present invention is directed to the use of patterned inner layers in the substrate of polymer-based banknotes, the present invention is not so limited and may also be utilized in or with credit cards, bank cards, licenses, identification (ID) documents, tax stamps, labels, other secure instruments, and the like.

The embodiments and examples above are illustrative, and many variations can be introduced to them without departing from the spirit of the disclosure or from the scope of the appended claims. For example, elements and/or features of different illustrative and exemplary embodiments herein may be combined with each other and/or substituted with each other within the scope of this disclosure. For a better understanding of the invention, its operating advantages and the specific objects attained by its uses, reference should be had to the accompanying drawings and descriptive matter in which there are illustrated exemplary embodiments of the invention.

What is claimed is:

1. A method of authentication, comprising:

forming a secure instrument comprising:

providing a polymer substrate having a first surface and a second surface and a first end and a second end, coating the first surface of the polymer substrate with an inner layer, the inner layer being a conductive, absorbing, or upconverting layer and including one or more gaps therein, and coating the inner layer with an opacity layer;

detecting, by a detector, an anisotropy associated with the one or more gaps of the inner layer; and authenticating the secure instrument based on the anisotropy detected by the detector, wherein the one or more gaps of the inner layer are configured as one or more unconnected lines, at least one unconnected line of the one or more unconnected lines extending across the polymer substrate from the first end of the polymer substrate to the second end of the polymer substrate.

2. The method of claim 1, wherein the polymer substrate comprises biaxially-oriented polypropylene (BOPP).

3. The method of claim 1, wherein the inner layer comprises one or more of metallic particles or flakes, graphite, indium tin oxide, antimony tin oxide, or a semiconducting polymer.

4. The method of claim 3, wherein the inner layer further comprises a scattering material, the scattering material being one or more of titanium dioxide or zinc oxide.

5. The method of claim 1, wherein the opacity layer comprises one or more of a water-based ink, a solvent-based ink, and scattering particles.

6. The method of claim 1, wherein the one or more gaps of the inner layer are configured such that only a portion of an underlying layer is covered with the inner layer, the underlying layer being the polymer substrate or an intervening layer.

7. The method of claim 1, wherein the one or more gaps of the inner layer are configured as a pattern.

8. The method of claim 1, wherein the unconnected lines are parallel or orthogonally-arranged.

9. The method of claim 1, wherein the secure instrument further comprises:

a second inner layer disposed on or over the second surface of the polymer substrate, the second inner layer being a conductive, absorbing, or upconverting layer; and a second opacity layer disposed on or over the second inner layer disposed on or over the second surface of the polymer substrate.

10. The method of claim 9, wherein the second inner layer covers an entirety of an overlaying layer, the overlaying layer being the polymer substrate or an intervening layer.

11. The method of claim 9, wherein the second inner layer includes one or more gaps therein.

12. The method of claim 8, wherein the detector is a surface resistance meter configured to detect the anisotropy associated with the one or more gaps of the inner layer.

13. The method of claim 1, wherein the anisotropy associated with the one or more gaps of the inner layer of the secure instrument is capable of being detected at a rate of 40 secure instruments or more per second.

14. The method of claim 1, wherein the one or more unconnected lines are one or more straight lines or one or more curved lines.

15. The method of claim 1, wherein the secure instrument is a banknote, a credit card, a bank card, a license, an identification document, a tax stamp, or a label.

* * * * *